United States Patent Office 3,632,587
Patented Jan. 4, 1972

3,632,587
PIPERAZINO METHYL ISATINYLIDINE 3 ACETATES
John Hollowood, Henley-on-Thames, England, assignor to John Wyeth & Brother Limited, Taplow, Maidenhead, Berkshire, England
No Drawing. Filed Aug. 1, 1968, Ser. No. 749,296
Claims priority, application Great Britain, Aug. 16, 1967, 37,597/67
Int. Cl. C07d 51/70
U.S. Cl. 260—268 PH
2 Claims

ABSTRACT OF THE DISCLOSURE

Isatin derivatives having the formula

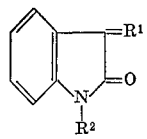

wherein $R^1$ is ethylenedioxy or a divalent radical of an aliphatic ester and $R^2$ is an aminoalkyl or acyl radical or a radical of the formula

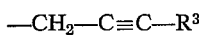

where $R^3$ is hydrogen or an aminomethyl radical are effective hypotensive agents; additionally, many of these also possess useful anti-inflammatory activity.

---

This invention relates to a new series of isatin derivatives to processes for the preparation thereof, and to pharmaceutical compositions containing such derivatives.

The present invention provides compounds of the general formula

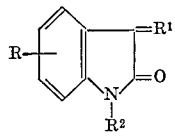

(I)

in which R is hydrogen, halogen, or an alkyl, alkoxy, nitro or haloalkyl radical, $R^1$ is a ketal radical or the radical obtained by removing two hydrogen atoms from the ω-carbon atom of (a) the acid moiety of an ester of a lower aliphatic acid, (b) a nitrile of such an acid, or (c) the acid itself, said acid containing 2 to 6 preferably 2 to 4 carbon atoms, and $R^2$ is an aminoalkyl radical, an acyl radical, an acyl radical or a radical of the general formula

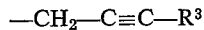

where $R^3$ is a hydrogen atom or an aminomethyl radical. Where the radical $R^2$ contains a nitrogen atom, the compounds of general Formula I can form acid addition and quaternary ammonium salts, and the invention also provides such salts.

The radical R preferably is hydrogen, (i.e. the ring is unsubstituted) but may, for example, also be a halogen atom (e.g. chlorine or bromine), an alkyl or alkoxy radical containing 1 to 4 carbon atoms( e.g. methyl or methoxy), a nitro radical or a haloalkyl radical (e.g. a trifluoromethyl radical). The radical $R^1$ preferably is a 1,2-dioxyethylene radical or the radical obtained by removing two hydrogen atoms from the ω-carbon atoms of the acid moiety of an alkyl ester of an aliphatic acid. For example $R^1$ may be a radical of the general formula $=CH-CO_2C_2H_5$. The radical $R^2$ is an aminoalkyl radical (preferably a tertiary aminomethyl radical), an acyl radical, (preferably an aroyl or substituted aroyl radical), a propargyl radical or a 4-amino-but-2-ynyl radical in which the amino group is a tertiary amino group. Preferred examples of $R^2$ are propargyl, piperidinomethyl, piperazinomethyl, N-substituted piperazinomethyl (in which the substituent is a phenyl, methyl or hydroxyethyl radical), morpholinomethyl, dimethylaminomethyl, diethylaminomethyl, benzoyl and p-halobenzoyl.

The new and novel compounds of the present invention possess valuable pharmaceutical activity. In particular, the new and novel compounds in standard pharmacological procedures demonstrate an ability to lower blood pressure and are useful as hypotensive agents. In addition, many of the compounds possess anti-inflammatory activity and are useful in the treatment of inflammation.

The compounds of Formula I generally may be prepared by condensing an isatin of the general formula

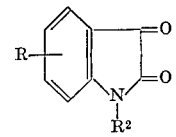

(II)

with a compound of the general formula

(III)

where R, $R^1$ and $R^2$ have the meanings defined above. When the compound of Formula III is a dihydric alcohol (e.g. ethylene glycol) the reaction advantageously is carried out in the presence of a strong acid (e.g. p-toluene sulphonic acid) to give the ketal. When the compound of general Formula III is an ester of a lower aliphatic acid, the reaction advantageously is carried out in the presence of a condensing agent, such as a trialkylphosphonoacetate, of which the triethyl ester is preferred (the Wittig reagent).

It is generally also possible to prepare compounds of general Formula I by reacting a substituted isatin of the general formula

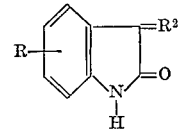

(IV)

with a compound capable of introducing a radical $R^2$ where R, $R^1$ and $R^2$ have the meanings defined above. When $R^1$ is an acyl radical, the substituted isatin of Formula IV can be reacted directly with an acylating agent, e.g. a halide of formula $R^2$ Hal. When $R^2$ is other than acyl, the substituted isatin of general Formula IV can be converted to an alkali metal salt (e.g. the sodium or potassium salt), e.g. by reaction with an alkali metal hydride, and the salt reacted with a compound of formula $R^2-X$, where X is a halogen atom or an alkyl or aryl sulphonyl radical.

As a modification of this process, when $R^2$ is an aminomethyl radical, a Mannich reaction can be carried out on the compound of general Formula IV using formaldehyde or paraformaldehyde and an amine. The useful conditions for a Mannich reaction are used.

When $R^2$ is an aminobutynyl radical, such compounds can be prepared by carrying out a Mannich reaction on an isatin of the general formula

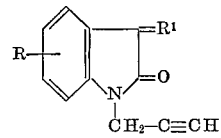

(V)

using formaldehyde or paraformaldehyde and an amine where R and $R^1$ have the meaning defined above. The usual conditions for a Mannich reaction are used.

The starting materials of Formula II containing a piperazinomethyl or N-substituted piperazinomethyl radical can be prepared by carrying out a Mannich reaction using the corresponding isatin unsubstituted at the 1-position, formaldehyde and the appropriate piperazine or N-substituted piperazine. The remaining reactants employed in the foregoing reactions either are known compounds, which are commercially available or can be prepared by methods known in the art, or are derivatives thereof which can be prepared by well-known chemical procedures from appropriate starting materials following the methods described in the art for the known compounds. If any active groups which would interfere with a reaction described above are present, such groups are blocked while the reaction is being carried out and are freed later. For example, when a compound in which $R^1$ contains a carboxyl group is desired this group if necessary can be obtained as a final step by hydrolysis of a nitrile or ester group.

When the compounds of general Formula I contain a basic nitrogen atom, they can form acid addition salts by reaction with an organic or inorganic acid (e.g. hydrochloric, sulphuric or fumaric acid) or quaternary ammonium salts with a quaternising agent (e.g. methyl iodide), and the invention also provides such salts.

The invention further provides a pharmaceutical composition comprising a compound of general Formula I, or an acid addition or quaternary ammonium salt thereof, and a pharmaceutically acceptable carrier. The composition may be solid, liquid or cream-like, and may, for example, be in the form of tablets, capsules or a solution.

In the pharmacological evaluation of the properties of the compounds of this invention, the effects in vivo of the compounds are tested according to the following procedures:

(a) To test for hypotensive activity the procedure was as follows:

Blood pressure, heart rate and respiration are recorded. Blood pressure responses to the injection of epinephrine, acetylcholine and histamine are determined before and after administration of each dose of the test drug. Nictitating membrane responses to electrical stimulation are also recorded before and after drug administration. Drugs are injected intravenously, generally in doses of 0.2, 2 and 20 mg./kg. The three doses are injected approximately 30 minutes apart. The responses to the highest dose are observed for a minimum of 2 hours. The next higher dose is only given when the blood pressure has returned to the control level. A drug is considered active if it changes blood pressure by 25–30 mm. for 30 minutes.

The above method detects changes in blood pressure, gives some information as to the possible mechanisms involved and determines some autonomic effects of compounds. For example, adrenergic and ganglionic blocking agents and "sympathetic anti-release" compounds would inhibit the contraction of the nictitating membrane when its nerve is electrically stimulated.

(b) To test anti-inflammatory activity, the procedure of Winter et al., Proc. Soc. Exp. Biol. and Med. 111, 544 (1962) and Buttle et al., Nature 179, 629 (1957) was followed.

The compounds of this invention in the above test procedure (a) when administered intravaneously at a dosage of about 5 to about 20 mg./kg. demonstrate hypotensive activity.

When the compounds of this invention are employed as hypotensive agents they may be administered to warm-blooded animals, e.g. mice, rats, rabbits, dogs, cats, monkeys, etc., alone or in combination with pharmacologically acceptable carriers, the proportion of which is determined by the solubility and chemical nature of the compounds, chosen route of administration and standard biological practice. For example, they may be administered orally in the form containing such excipients as starch, milk, sugar, and so forth. They may also be administered orally in the form of solutions or they may be injected parenterally. For parenteral administration they may be used in the form of a sterile solution or suspension containing other solutes, for example enough saline or glucose to make the solution isotonic.

The dosage of the present agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following non-limiting examples illustrate the invention.

EXAMPLE 1

Ethyl 1-(4'-phenylpiperazinomethyl)-isatinylidene-3-acetate

Triethylphosphonoacetate (22.4 g., 0.1 mole) was added dropwise at 20° C. to a slurry of sodium hydride (4.8 g., 0.1 mole of a 50% oil suspension) in dry 1,2-dimethoxyethane (200 ml.). After the addition, the reaction mixture was stirred for one hour at room temperature until all gas evolution had ceased. N-(N'-phenyl-piperazinomethyl)-isatin (32.1 g., 0.1 mole prepared by a Mannich reaction on isatin with formaldehyde and N-phenylpiperazine) was then added in small batches over a period of fifteen minutes. The solution formed was stirred at room temperature for one hour then poured into water (2 litres) to give a yellow solid. The mixture was extracted into methylene chloride (3 × 300 ml.), the methylene chloride extracts dried (MgSO₄) and the solvent removed to leave ethyl 1-(4'-phenylpiperazinomethyl)-isatinylidene-3-acetate as an orange solid. This was recrystallised from ethanol to give orange needles. Yield 32 g. (82%) M.P. 146–8° C.

Analysis.—Found (percent): C, 70.7; H, 6.6; N, 10.9. $C_{23}H_{25}N_3O_2$ requires (percent): C, 70.65; H, 6.45; N, 10.75.

When tested in procedure (a) this compound showed a moderate fall in blood pressure at an i.v. dose of 5 and 10 mg./kg. When tested in procedure (b) it showed 52% inhibition at an oral dose of 250 mg./kg.

EXAMPLE 2

Ethyl 1-(N-piperidinomethyl)isatinylidene-3-acetate

The procedure of Example 1 was followed, but using triethyl phosphonoacetate (11.2 g.) and sodium hydride (2.40 g.) in 1,2-dimethoxyethane (100 ml.) and N-piperidinomethyl-isatin (12.2 g.) to give the title compound. Yield 12.2 g. (78%), M.P. 91–92° C.

Analysis.—Found (percent): C, 68.8; H, 7.1; N, 9.1. $C_{18}H_{22}N_2O_3$ requires (percent): C, 68.85; H, 7.1; N, 9.2.

When tested in procedure (a), this compound showed a very pronounced fall in blood pressure at an i.v. dose of 5 mg./kg.

EXAMPLE 3

Ethyl 1-(N-morpholinomethyl)isatinylidene-3-acetate

The procedure of Example 1 was followed, but using triethylphosphonoacetate (11.2 g.) and sodium hydride (2.4 g.) in 1,2-dimethoxyethane (150 ml.), and N-morpholinomethyl-isatin (12.3 g.) to give the title compound. Yield 11.9 g. (75%), M.P. 134–5° C.

Analysis.—Found (percent): C, 64.4; H, 6.4; N, 8.4. $C_{18}H_{20}N_2O_4$ requires (percent): C, 64.6; H, 6.4; N, 8.8.

When tested in procedure (a), this compound showed a pronounced fall in blood pressure at i.v. doses of 5 and 20 mg./kg.

EXAMPLE 4

Ethyl 1-(prop-2'-yne)isatinylidene-3-acetate

Isatin (7.35 g.) in D.M.F. (50 ml.) was treated with sodium hydride (2.4 g.) at 60° C., followed by propargyl bromide (5.95 g.) and stirred for 3 hours at that temperature. After cooling, pouring into water, filtering and recrystallising from ethanol, N-propargyl-isatin M.P. 157–3° C. was obtained.

The procedure of Example 1 was then followed, but using triethylphosphonoacetate (4.48 g.) and sodium hydride (0.96 g.) in 1,2-dimethoxyethane (40 ml.) and N-propargyl-isatin (3.7 g.) to give the title compound. Yield 3.4 g. (67%), M.P. 95–96° C.

*Analysis.*—Found (percent): C, 70.7; H, 5.3; N, 5.4. $C_{15}H_{13}NO_3$ requires (percent): C, 70.65; H, 5.1; N, 5.5.

When tested in procedure (a), this compound showed a very pronounced fall in blood pressure at an i.v. dose of 5 mg./kg.

EXAMPLE 5

Ethyl 1-(p-chlorobenzoyl)isatinylidene-3-acetate

Isatin (7.35 g.) in D.M.F. (50 ml.) was treated with a suspension of sodium hydride (2.4 g.) followed by adding p-chlorobenzoyl chloride (7.95 g.). After stirring for 30 minutes, the purple colour disappeared to give a yellow suspension which was poured into water, filtered and recrystallised from ethanol to give N-(p-chlorobenzoyl)-isatin monoethanolate, M.P. 102–3° C. Yield. 6.8 g. (47%).

The procedure of Example 1 was then followed, but using triethylphosphonoacetate (1.12 g.) and sodium hydride (0.24 g.) in 1,2-dimethoxyethane (10 ml.) and N-(p-chlorobenzoyl)-isatin monoethanolate (1.675 g.) to give the title compound as the monoethanolate. Yield 0.8 g. (40%), M.P. 85–87° C.

*Analysis.*—Found (percent): C, 62.67; H, 5.3; N, 3.6; Cl, 8.9. $C_{19}H_{14}NO_4Cl \cdot C_2H_5OH$ requires (percent): C, 62.74; H, 5.0; N, 3.5; Cl, 8.8.

EXAMPLE 6

N-(2-propynyl)-oxindole-3-spiro-2'-(1,3-dioxolane)

N-(2-propynyl)-isatin (7.4 g., 0.04 mole), ethylene glycol (6.2 g.), benzene (150 ml.) and p-toluenesulphonic acid (1 g.) were heated under reflux for 3 hours, when 1.5 ml. of water were collected on a Dean and Stark apparatus. The mixture was then poured into saturated sodium bicarbonate solution and the mixture extracted with benzene (2× 50 ml.). The combined benzene extracts were dried (MgSO₄) and the solvent removed on the rotary evaporator to give a pale orange solid. Crystallisation from ethanol gave pale yellow platelets, 7.1 g. (77%) of N-(2-propynyl)-oxindole-3-spiro-2'-(1,3-dioxolane), M.P. 122–123° C. Yield 7.1 g. (72%).

*Analysis.*—Found (percent): C, 67.9; H, 5.05; N, 6.1. $C_{13}H_{11}NO_3$ requires (percent): C, 68.2; H, 4.8; N, 6.1.

When tested in procedure (b), this compound showed 53% inhibition at 250 mg./kg.

This compound can be subjected to a Mannich reaction with formaldehyde and an amine, for example, piperidine, piperazine, morpholine, dimethylamine, diethylamine, pyrrolidine, N-phenylpiperazine, N-methylpiperazine or N-(β-hydroxyethyl) piperazine to give compounds of general Formula I in which $R^2$ is a 4-amino-but-2-ynyl radical, the amine moiety of which corresponds to the amine used.

We claim:

1. A compound having the formula

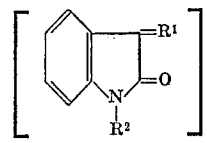

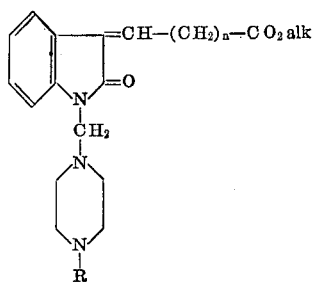

in which $n$ is a small whole number from 0 to 4 inclusive, alk is a lower alkyl radical, and R is a member of the group consisting of hydrogen, phenyl, methyl, and hydroxyethyl.

2. A compound according to claim 1, wherein said compound is ethyl 1-(4'-phenylpiperazinomethyl)-isatinylidene-3-acetate.

References Cited

UNITED STATES PATENTS

| | | | |
|---|---|---|---|
| 2,857,394 | 10/1958 | De Stevens | 260—268 X |
| 3,203,949 | 8/1965 | Hopkins | 260—268 X |
| 3,374,234 | 3/1968 | Arya | 260—268 X |

OTHER REFERENCES

Ried et al., Chem. Abstr., vol. 67, col. 108543G (1967).

DONALD G. DAUS, Primary Examiner

U.S. Cl. X.R.

260—247.2 B, 268 BC, 294.3 E, 325; 424—216, 250, 267

PO-1050
(5/69)

UNITED STATES PATENT OFFICE
CERTIFICATE OF CORRECTION

Patent No. 3,632,587　　　　　　　　Dated January 4, 1972

Inventor(s) John Hollowood

It is certified that error appears in the above-identified patent and that said Letters Patent are hereby corrected as shown below:

In column 1, at line 50, the words "an acyl radical" (second appearance in the sentence) should be deleted.

In column 2, at about line 40, correct formula IV by replacing "$R^2$" by -- $R^1$ --; at line 46, replace "When $R^1$ is an acyl radical" by -- When $R^2$ is an acyl radical --; at line 58, replace "useful" by -- usual --.

In column 6, lines 15-20, delete the heavy brackets and the entire formula enclosed thereby.

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents